Aug. 8, 1961 R. H. SAMPLES 2,995,346
APPARATUS FOR MIXING MATERIALS FORMING VISCOUS MASSES
Filed Sept. 15, 1958 2 Sheets-Sheet 1
Fig. 1.
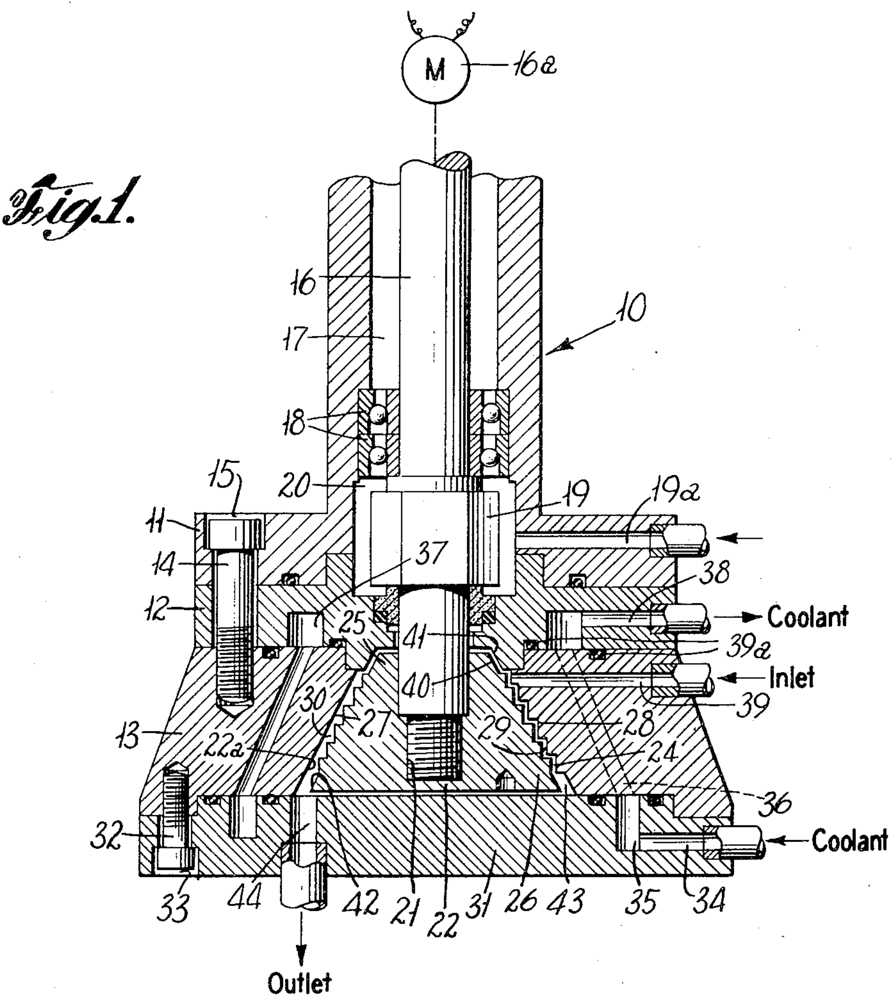
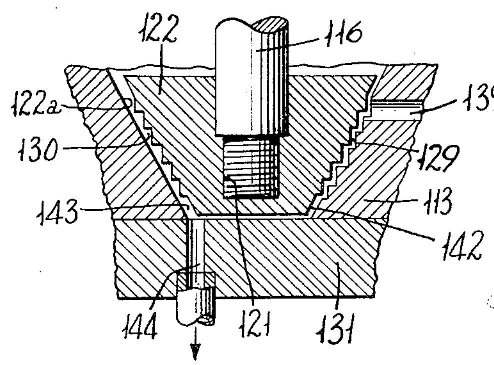
Fig. 5
INVENTOR.
RANDALL H. SAMPLES
BY William F. Mesinger
ATTORNEY

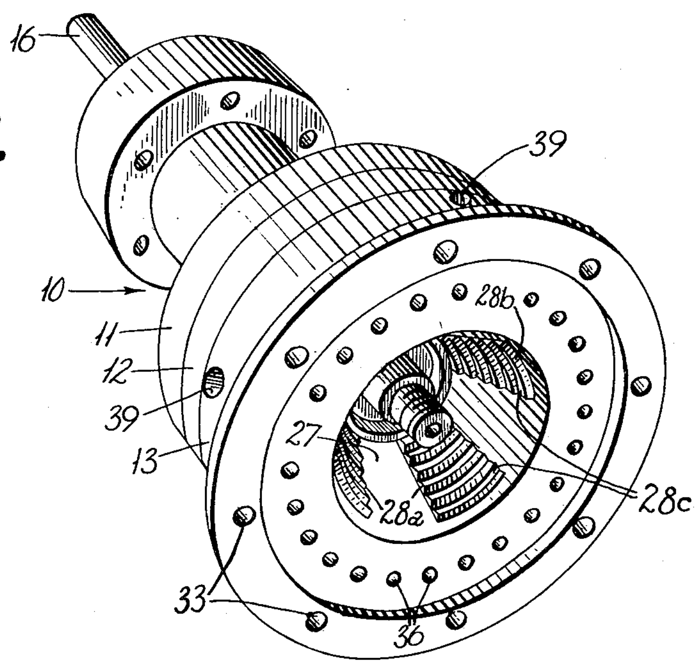
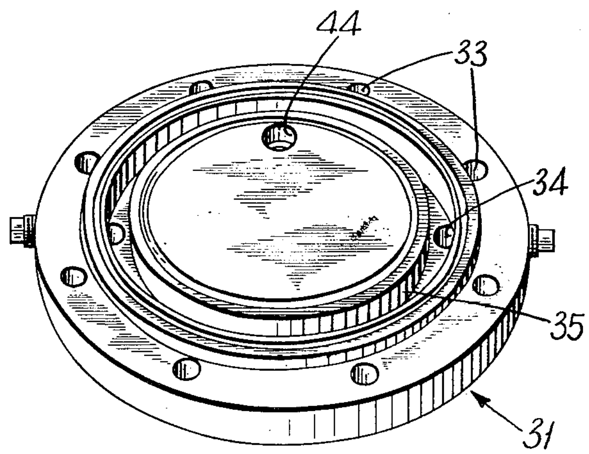
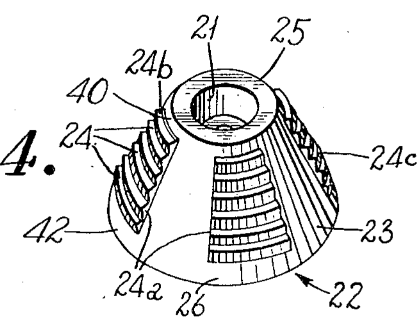
INVENTOR
RANDALL H. SAMPLES
BY *William F. Meisinger*
ATTORNEY United States Patent Office 2,995,346
Patented Aug. 8, 1961

1

2,995,346

APPARATUS FOR MIXING MATERIALS FORMING VISCOUS MASSES

Randall H. Samples, South Charleston, W. Va., assignor to Union Carbide Corporation, a corporation of New York Filed Sept. 15, 1958, Ser. No. 761,005
11 Claims. (Cl. 259—8)

This invention relates to an improved apparatus for mixing materials forming viscous masses, and more particularly for mixing reactive liquids and gases which when contacted with each other tend to form solids or become very viscous in a short residence time. The invention is especially suitable for mixing raw materials to obtain a polyurethane foaming formulation which solidifies to form foams used for cushions, crash pads for automobiles, vibration damping devices and the like.

When certain materials are mixed they react to form solids, and others become very viscous in a relatively short contact time. In both cases the prior art mixers tend to clog because of the change in physical state; such clogging makes further mixing difficult or impossible. Furthermore, heat transfer during mixing is impeded and the temperature of the mass becomes uncontrollable. Other disadvantages of presently used mixers include excessive time required to achieve thorough mixing, excessive holdup, areas of lesser agitation and internal recycle. These limitations are particularly serious in the interdispersion of the feed materials used in polyurethane foam formulations because it is desirable that different batches of such materials be mixed to the same degree, regardless of the mixer throughput rate. This is because a predetermined degree of mixing produces foams having optimum physical characteristics, and unless the mixing is readily controllable it will be impossible to obtain reproducible results.

In the heretofore known rotary mixers, the number of internal mixing cycles is not easily controllable, and such mixers may not be readily operated to obtain the same degree of mixing for various material throughput rates.

A principal object of the present invention is to provide an improved apparatus for mixing materials to any desired and controllable degree, particularly materials tending to form viscous or solid masses.

A further object is to provide an improved apparatus for mixing viscous feed materials to prepare polyurethane foaming formulations.

Among other objects of this invention are to provide an apparatus for thorough mixing of two or more feed material streams in a minimum of time with no internal areas of recycle, lack of dead space for accumulation of solids, utilization of several mixing principles for maximum interdispersion of materials with widely different physical properties, efficient heat transfer from the materials being mixed to a coolant, mixing action that incorporates homogenization, shearing and folding, and self-cleaning of the mixing passages effected by the imposed order of flow.

Still further objects and advantages of the present invention will be apparent from the following description and accompanying drawings.

In rotating cone-type mixers, the mixing violence of each stage is a function of speed, and throughput rate is inversely proportional to the residence time exposure to each separate mixing function such as shear, homogenization and folding. It has been discovered that one reason why the prior art rotating cone mixers do not provide a consistent degree of mixing with varying material throughputs is that the mixing functions and stages have been aligned along the path of the flowing material, and parallel to the axis of cone rotation. Thus, the same number of

2 mixing stages is obtained with all cone rotation speeds. The present invention contemplates aligning the mixing functions in successive order across the path of material throughput, and perpendicular to the axis of cone rotation. Thus, the internal mixing cycles are solely controlled by the rate of cone rotation; this permits an increase in the number of mixing stages at will and with infinite control. For example, the raw materials fed to the mixer at twice a given throughput rate may be subjected to the same number of mixing stages and the same optimum degree of mixing by simply doubling the cone rotating speed. This remarkable result is accomplished with the further advantageous features of self-cleaning and very low mixer volume or material holdup.

More specifically, the present invention provides a method of mixing materials forming viscous masses including the steps of providing and uniting feed materials as a coarsely-mixed mass, and rotating such mass in constantly changing diameters so as to impart a spiral motion thereto. The spirally rotating viscous mass is subjected to alternating stages of simultaneous homogenization and shearing, and simultaneous folding and raking, the alternating stages being perpendicular to the axis of rotation of the spiralling mass so that the number of stages for a given material throughput rate is directly determined by the rotational velocity of the mass. When excessive heat is generated during mixing for example by reaction between the raw materials, the spirally rotating viscous mass is preferably cooled during the various mixing stages.

The apparatus of the present invention includes a cone-shaped rotor and drive means communicating with one end thereof, the rotor having alternate smooth and step-toothed segments around the sloping surface thereof and extending substantially the entire length of such rotor, the tooth segments consisting of stepped rows of teeth having surfaces substantially perpendicular, coplanar and concentric to the axis of rotation. A stator member is provided which has a hollow conical chamber for axial alignment of the cone-shaped rotor therein, the stator also having alternate smooth and step-toothed segments around the sloping walls of the hollow conical chamber extending substantially the entire length thereof. The stator tooth segments consist of stepped rows of teeth having surfaces substantially perpendicular, coplanar and concentric to the axis of rotation. The rotor and the hollow stator chamber are sized so that the rotating and stationary teeth mesh with a first very small clearance therebetween to facilitate first stages of simultaneous homogenization and shearing of the viscous mass on passage through the first clearance space. Also, the toothed segments occlude to the opposite smooth segments with a second slightly larger clearance therebetween to facilitate second stages of simultaneous folding and raking of the viscous mass on passage therethrough, the first and second stages being perpendicular to the axis of rotation. A first passageway communicates with the first and second clearance spaces at one end of the cone-shaped rotor for introduction of feed material thereto, and a collecting space for the mixed material is located between the opposite ends of the rotor and the hollowed stator chamber, the collecting space communicating with the first and second clearance spaces. A second passageway communicates with the mixed material collecting space for discharge of such material therefrom.

In the preferred form of the invention the feed material is introduced at the small end of the cone-shaped rotor and discharged at the large end thereof. Also the first clearance between the rotating and stationary teeth is preferably between about 0.0035 and 0.10 inch and the second clearance between the step-toothed and opposite smooth segments is between about 0.005 and 0.14 inch. Furthermore, when the mixer processes a polyester having at least two terminal hydroxyl groups (e.g. adipic acid), n- methyl morpholine, a nonionic emulsifier, water and tolylene diisocyanate as feed materials to form a viscous polyurethane foaming formulation, the first clearance is preferably between about 0.01 and 0.04 inch and the second clearance is preferably between about 0.014 and 0.057 inch. In the practice of this invention, it is also preferable to provide means for varying the rotating speed of the cone-shaped rotor thereby facilitating a uniform and optimum degree of mixing for various material throughput rates.

In the accompanying drawings wherein are illustrated certain preferred forms of the invention, FIGURE 1 is a view of a longitudinal section through the lower part of the mixer;

FIGURE 2 is a perspective view looking toward the bottom of the discharge portion of the mixer with the front stator cover and the rotor removed;

FIGURE 3 is a perspective view looking downwardly on the front stator cover;

FIGURE 4 is a perspective view looking downwardly on the cone-shaped rotor; and

FIGURE 5 is a fragment view of a longitudinal section through a rotor-stator assembly suitable as an alternative to the assembly shown in FIGURE 1.

Referring to the drawings, main housing 10 has a flanged head section 11 fitting over and concentrically aligned on rear stator cover 12, the latter in turn being aligned by and fitting over stator member 13. The aforementioned members are tightly secured to each other by bolts 14 in borings 15, and threaded into the boring walls of the stator cover 12 and stator member 13. Any convenient number of threaded bolts may be used, e.g. eight, and they are preferably spaced at equal distances around the circumference of the components. Drive shaft 16 attached at one end to suitable variable speed driving means **16*a* extends through the hollow center section 17 of main housing 10 and is aligned by bearing assemblies 18 and lubricated packing liners 19 positioned between the drive shaft 16 and a recessed portion 20 of the hollow center section 17. Packing liners 19 are lubricated by the introduction of a suitable lubricating medium through boring 19*a* in flanged head section 11. The other threaded end of drive shaft 16 extends into an axially aligned boring 21 in the small end of a truncated cone-shaped rotor 22, the lower portion of the rotor being threaded for engagement with shaft 16** to facilitate rotation.

Rotor 22 is axially aligned in a hollow conical chamber **22*a* of stator 13, the rotor having alternate smooth and step-toothed segments 23 and 24, respectively, around its sloping surface and extending substantially the entire length thereof; that is, from the small end 25 to the large end 26 of the rotor. The sloping walls of the hollow conical chamber 22*a* of stator 13 also have alternate smooth and step-toothed segments 27 and 28, respectively, extending substantially the entire length thereof. There are preferably three different sets of working surfaces on the step-toothed segments 24 and 28 which contribute to the mixing action. These are plane faces 24*a* and 28*a* which are substantially coplanar with the axis of rotation, plane faces 24*b* and 28*b* which are substantially perpendicular to the axis of rotation, and cylindrical faces 24*c* and 28*c* which are substantially concentric with the axis of rotation. Also, the hollow conical chamber 22*a* of the stator 13 and the conical rotor 22 are sized so that the rotating and stationary teeth mesh with a first very small clearance 29 between the plane faces 24*b* and 28*b*, and the cylindrical faces 24*c* and 28*c* to facilitate first mixing stages of simultaneous homogenization and shearing of the viscous mass on passage therethrough. Clearance 29 between the meshing teeth is preferably between about 0.0035 and 0.10 inch as will be discussed later in detail. In the case of mixing and reacting feed materials to form a viscous polyurethane foaming formulation having a viscosity of about 350–2,000 centipoises, a meshing teeth clearance of between about 0.01 and 0.04 inch has been found to be an optimum balance between thorough mixing on one hand, and high rate of throughput on the other hand. That is, if a larger clearance is used the throughput rate will be higher but the mixing efficiency will be excessively reduced. Another factor to be considered in determining the optimum meshing teeth clearance is the fluidity of the materials being mixed. It may be preferable to provide a relatively small clearance if the materials being processed are of relatively high fluidity. Although it is preferred to have the same clearance 29 between both the plane faces 24*b* and 28*b*, and the cylindrical faces 24*c* and 28*c***, this may be difficult to achieve mechanically, and is not essential to the invention.

The hollow conical chamber **22*a* of stator 13 and the conical rotor 22 are also sized and shaped so that a second clearance 30 between the smooth and step-toothed segments exists which provides second mixing stages of simultaneous folding and raking of the viscous mass on passage therethrough. Clearance 30 between the toothed surfaces 24 and 28 and smooth surfaces 23 and 27 depends on the particular cone angle used and is a maximum for a cone angle of 45°, the clearance 30 approaching first clearance 29 between the meshing teeth as the cone angle approaches either 0° or 90°. Clearance 30 is preferably between about 0.005 and 0.14 inch, as a larger space would prevent effective folding of the materials and rake cleaning of the smooth surfaces 23 and 27** and a smaller space would unduly reduce the throughput. In the case of mixing and reacting feed materials to form a viscous polyurethane foaming formulation, a clearance of between about 0.014 and 0.057 inch has been found to be an optimum balance between effective folding and raking on one hand, and high throughput rate on the other hand.

The large diameter ends of rotor 22 and stator 13 are enclosed by front stator cover 31, the latter two components being secured to each other by bolts 32 threaded into the walls of hole drillings 33. Such bolts are preferably placed at uniform intervals around the circumference of front stator cover 31. A suitable coolant such as water is introduced through horizontal boring 34 in front stator cover 31 into manifold ring 35 for flow through inclined passageways 36 in countercurrent heat exchange relation with the materials being mixed between stator 13 and rotor 22. The coolant discharged from passageways 36 is collected in manifold 37 and discharged through horizontal boring 38 in rear stator cover 12. Suitable O-rings **39*a* are provided at both ends of passageways 36** to prevent leakage of the coolant.

When two or more streams of materials are fed to the mixer, they are preferably combined immediately before entering horizontal borings 39 by suitable joints or by conventional manifold arrangements. The feed materials enter the mixer through boring 39 in stator 13 and pass into the annular clearance space between the stator 13 and rotor 22, where mixing begins. The angular close clearance between the rotating lip 40 and the stationary groove 41 tends to oppose material flow towards the shaft 16 by centrifugal force. This force in turn facilitates downward material flow down the annular clearance spaces between the stator 13 and rotor 22 in progressively increasing diameters so as to impart a spiral motion thereto. The rotary motion imparts centrifugal force to the mixing materials which causes flow outward and down the sloping annular clearance spaces 29 and 30, thus substantially eliminating any recycling. Chewing action is obtained by the occluding fronts of stationary teeth 28 and rotating teeth 24, and the materials then undergo homogenization as they are forced radially through the first very small clearance space 29 by mechanical force of the rotor and by the action of centrifugal force. During this first mixing stage, the materials are also simultaneously exposed to shearing, which refers to the action or stress resulting from the forces which cause at least two contiguous parts of the materials to slide relative to each other in a direction parallel to their plane of contact.

Thus, it can be seen that in the first mixing stages of this invention, two different mixing methods are utilized simultaneously which provides remarkably high mixing efficiency. As the rotating teeth 24 emerge from mesh with the stationary teeth 28, the smooth rotating segments 23 are entered by the teeth of the stationary step-toothed segments 28 and the rotating toothed segments 24 traverse the stationary smooth segments 27. The points of the teeth are very close to the bottom of the voids and this relationship produces the second mixing stages of simultaneous raking and folding action of the mixing materials. The material after being exposed to a series of alternating first and second mixing stages as it flows in downward spirals of increasing diameter is discharged from the exit lip 42 by centrifugal force and impinged against the walls of collecting space 43, prior to discharge through drilling 44 in front stator cover 31. Cone rotating speeds of about 50 to 10,000 revolutions per minute are suitable with the mixer of the present invention, and the preferred speed for polyurethane foam formulations is about 3,500 revolutions per minute.

The outstanding advantages of the present mixer over the heretofore proposed rotating cone type mixers include superior mixing ability for materials forming viscous masses because several different mixing methods are utilized in the two mixing stages. This was illustrated in one series of tests in which mixtures of tolylene diisocyanate and polyesters were prepared as a foaming formulation in a conventional, well-known mixer utilizing only homogenization as a mixing method. Foams of reasonable quality were produced when the minor ingredients were premixed with one of the main components. However, when water was introduced as a minor ingredient without premixing, incomplete mixing was evident by the resulting irregularity of the foam produced. Inspection of the interior of the prior art mixer after operation revealed accumulation of solids and this necessitated cleaning of such mixer after each run in order to maintain mixing efficiency. In contrast, by using the mixer of the present invention, three or more major and minor feed streams were thoroughly interdispersed with no accumulation of solids whether the feed materials were miscible or not. Adequate mixing was obtained at cone rotating speeds of 3,000 revolutions per minute and even lower, whereas 7,000 revolutions per minute was required for the prior art mixer and results were still unsatisfactory.

The present mixer is particularly advantageous for mixing feed materials where the same degree of mixing is required even though the throughput rate may vary as may be the case in the formation of viscous polyurethane foaming formulations. Furthermore, the mixer is readily adaptable for intermittent use such as would be desirable in filling molds. In such applications, the machine may be shut down for short periods of a few seconds to several minutes to allow repositioning of molds or forms and subsequently restarted with a minimum waste of material and avoidance of stoppages caused by setting up of reactive materials remaining in the machine. The present mixer may be operated at positive mixing pressures and may process gases as feed materials if desired.

The effectiveness of the present mixer in preparing polyurethane foaming formulations is illustrated by the following examples.

*Example I*

A polyurethane foaming formulation was mixed using a machine similar to the mixer illustrated in the drawings, in which the ingredients were fed in two separate streams using metering pumps. Stream "A" entering the mixer consisted of a premixture containing 95 parts by weight of polyester, 1.4 parts of n-methyl morpholine, 2.2 parts of a nonionic emulsifier, and 1.4 parts of water. Stream "B" consisted of tolylene diisocyanate. These streams were fed simultaneously to the mixer at a ratio of 84.6 parts of stream "A" and 16.4 parts of stream "B". The resulting foam had a density of 4.64 pounds per cubic foot, a compression load requirement of 0.86 pound per square foot for a deflection of 50 percent, and the tensile load required for rupture was 6.0 pounds per square inch. Based on commercial standards, this foam was considered to be of high quality.

*Example II*

A second run was made using the same machine and same ingredients were fed in the same proportions as in Example I but with the addition of a stream of $CO_2$ gas to seed foam cell formation, as described more completely in copending U.S. application S.N. 792,724, filed on February 12, 1959, in the names of Randall H. Samples, Russell Van Cleve and Fritz Hostettler. Mixer pressures were essentially atmospheric and the flow rate of the $CO_2$ gas was controlled below the amount which would cause blow-through or "pop-gunning" or otherwise cause the mixture to be forced through the mixer with such speed as to prevent adequate mixing. The resulting foam had a density of 3.79 pounds per cubic foot, a compression load of 0.54 pound per square inch at 50 percent deflection, and a tensile strength of 5.0 pounds per square inch. This foam was also considered high quality by commercial standards.

Although preferred embodiments of the invention have been described in detail, it is contemplated that modifications of the method and apparatus may be made and that some features may be employed without others, all within the spirti and scope of the invention. For example, additional rows of stepped teeth may be preferred in larger machines, while relatively small units may require fewer rows than shown in the illustrated mixer. Also, the drive shaft attachment to the rotor may be made at the large diameter discharge end instead of the small diameter inlet end, or in the case of larger machines, it may be preferable to extend the shaft completely through the rotor and thus provide additional bearing journal surfaces. For generation of polyurethane foaming formulation, an angle between the axis of rotation and the rotor smooth contact surface of about 45° is preferred. However, materials with other flow requirements or different ranges of rotating speed may be best served by some angle between that nearly perpendicular to the rotating axis (e.g. 85°) over the range to that nearly parallel to the rotating axis (e.g. 5°).

FIGURE 5 shows an alternative rotor-stator assembly in which one end of drive shaft 116 extends into an axially aligned boring 121 in the large end of cone shaped rotor 122, and the feed materials enter the mixer through boring 139 into the annular clearance space between stator 113 and rotor 122. Thus, mixing is initiated at the large end of rotor 122 and the mass rotates in progressively decreasing diameters until it reaches collecting space 143 at the small end of rotor 122. The mixing action in this embodiment of the invention is substantially the same as previously discussed in conjunction with FIGURES 1 and 2, but the power required to perform a given mixing job would probably be slightly higher than when the mass is rotated in progressively increasing diameters. This is due to the fact that in the latter case, centrifugal force is aiding mixing whereas in the FIGURE 5 embodiment, the centrifugal force must be overcome to obtain mixing.

Materials of construction which may be used for the fabrication of the present mixer are only restricted by its prospective uses. Almost any material which will retain its shape may be used although for practical considerations, casting metals, machinable metals, glass, ceramics, and plastics either individually or in combination are preferred. Also, the temperature range of operation is only restricted by the materials of construction and the desired mixing temperature. The present mixing apparatus could be used over a wide range of temperatures ranging from those of red heat to at least that of liquid air.

What is claimed is:

1. Apparatus for mixing materials forming viscous masses comprising a cone-shaped rotor and drive means communicating with one end thereof, the rotor having alternate smooth and step-toothed segments around the sloping surface thereof and extending substantially the entire length of such rotor, the rotor tooth segments consisting of stepped rows of teeth having surfaces substantially perpendicular, coplanar and concentric to the axis of rotation; a stator member having a conical chamber for axial alignment of said cone-shaped rotor therein, the sloping walls of said conical chamber also having alternate smooth and step-toothed segments extending substantially the entire length thereof, the stator tooth segments consisting of stepped rows of teeth having surfaces substantially perpendicular, coplanar and concentric to the axis of rotation, the rotor and stator chamber being sized so that the rotating and stationary teeth mesh with a first very small clearance therebetween to facilitate first stages of simultaneous homogenization and shearing of the viscous mass on passage through such first clearance space, and so that the toothed segments occlude to the opposite smooth segments with a second slightly larger clearance space therebetween to facilitate second stages of simultaneous folding and raking of said viscous mass on passage therethrough, said first and second stages being perpendicular to the axis of rotation; a first passageway communicating with the first and second clearance spaces at one end of said cone-shaped rotor for introduction of feed material thereto; a mixed material collecting space between the opposite ends of the rotor and the stator chamber, such collecting space communicating with said first and second clearance spaces; and a second passageway communicating with the collecting space for discharge of mixed material therefrom.

2. Apparatus for mixing materials forming viscous masses comprising a cone-shaped rotor and drive means communicating with one end thereof, the rotor having alternate smooth and step-toothed segments around the sloping surface thereof and extending substantially the entire length of such rotor, the rotor tooth segments consisting of stepped rows of teeth having surfaces substantially perpendicular, coplanar and concentric to the axis of rotation; a stator member having a conical chamber for axial alignment of said cone-shaped rotor therein, the sloping walls of said conical chamber also having alternate smooth and step-toothed segments extending substantially the entire length thereof, the stator tooth segments consisting of steeped rows of teeth having surfaces substantially perpendicular, coplanar and concentric to the axis of rotation, the rotor and stator chamber being sized so that the rotating and stationary teeth mesh with a first very small clearance therebetween to facilitate first stages of simultaneous homogenization and shearing of the viscous mass on passage through such first clearance space, and so that the toothed segments occlude to the opposite smooth segments with a second slightly larger clearance space therebetween to facilitate second stages of simultaneous folding and raking of said viscous mass on passage therethrough, said first and second stages being perpendicular to the axis of rotation; a first passageway communicating with the first and second clearance spaces at the small end of said cone-shaped rotor for introduction of feed material thereto; a mixed material collecting space between the large ends of the rotor and the stator chamber, such collecting space communicating with said first and second clearance spaces; and a second passageway communicating with the collecting space for discharge of mixed material therefrom.

3. Apparatus according to claim 2 for mixing materials forming viscous masses, including coolant passageways in said stator member for removal of heat from the stator and the materials being mixed on passage therethrough.

4. Apparatus according to claim 2 for mixing materials forming viscous masses, in which the first clearance between said rotating and stationary teeth is between about 0.0035 and 0.10 inch.

5. Apparatus according to claim 2 for mixing materials forming viscous masses, in which the second clearance between the step-toothed and opposite smooth segments is between about 0.005 and 0.14 inch.

6. Apparatus according to claim 2 for mixing a polyester having at least two terminal hydroxyl groups, n-methyl morpholine, a nonionic emulsifier, water and tolylene diisocyanate for reaction to form a viscous polyurethane foaming formulation, in which the first clearance between said rotating and stationary teeth is between about 0.01 and 0.04 inch.

7. Apparatus according to claim 2 for mixing a polyester having at least two terminal hydroxyl groups, n-methyl morpholine, a nonionic emulsifier, water and tolylene diisocyanate for reaction to form a viscous polyurethane foaming formulation, in which the second clearance between the step-toothed and opposite smooth segments is between about 0.014 and 0.057 inch.

8. Apparatus according to claim 2 for mixing materials forming viscous masses, in which means are provided to vary the speed of rotation of said cone-shaped rotor, thereby obtaining the same degree of mixing for various rates of material throughput.

9. Apparatus according to claim 2 for mixing materials forming viscous masses, in which said cone-shaped rotor rotates at a speed of between about 50 and 10,000 revolutions per minute.

10. Apparatus according to claim 2 for mixing a polyester having at least two terminal hydroxyl groups, n-methyl morpholine, a nonionic emulsifier, water and tolylene diisocyanate for reaction to form a viscous polyurethane foaming formulation, in which said cone-shaped rotor rotates at a speed of about 3,500 revolutions per minute.

11. Apparatus for mixing materials forming viscous masses comprising a cone-shaped rotor and drive means communicating with one end thereof, the rotor having alternate smooth and step-toothed segments around the sloping surface thereof and extending substantially the entire length of such rotor, the rotor tooth segments consisting of stepped rows of teeth having surfaces substantially perpendicular, coplanar and concentric to the axis of rotation; a stator member having a conical chamber for axial alignment of said cone-shaped rotor therein, the sloping walls of said conical chamber also having alternate smooth and step-toothed segments extending substantially the entire length thereof, the stator tooth segments consisting of stepped rows of teeth having surfaces substantially perpendicular, coplanar and concentric to the axis of rotation, the rotor and stator chamber being sized so that the rotating and stationary teeth mesh with a first very small clearance of between about 0.01 and 0.04 inch to facilitate first stages of simultaneous homogenization and shearing of the viscous mass on passage through such first clearance space, and so that the toothed segments occlude to the opposite smooth segments with a second slightly larger clearance space of between about 0.014 and 0.057 inch to facilitate second stages of simultaneous folding and raking of said viscous mass on passage therethrough, said first and second stages being perpendicular to the axis of rotation; a first passageway communicating with the first and second clearance spaces at the small end of said cone-shaped rotor for introduction of feed material thereto; a mixed material collecting space between the large ends of the rotor and the stator chamber, such collecting space communicating with said first and second clearance spaces; a second passageway communicating with the collecting space for discharge of mixed material therefrom; coolant passageways in said stator member for removal of heat from the stator and the materials being mixed on passage therethrough; and means for varying the speed of rotation of said cone-shaped rotor thereby obtaining the same degree of mixing for various rates of material throughput.

References Cited in the file of this patent

UNITED STATES PATENTS

| | | |
|---|---|---|
| 1,230,395 | Fornander | June 19, 1917 |
| 2,577,279 | Simon et al. | Dec. 4, 1951 |
| 2,764,565 | Hoppe et al. | Sept. 25, 1956 |
| 2,768,405 | Mineah | Oct. 30, 1956 |
| 2,769,622 | Jensen | Nov. 6, 1956 |
| 2,770,241 | Winkler | Nov. 13, 1956 |
| 2,814,827 | Snow et al. | Dec. 3, 1957 |
| 2,816,741 | Shuffman | Dec. 17, 1957 |